United States Patent Office 3,047,147
Patented July 31, 1962

3,047,147
INSTALLATION FOR THE CONTINUOUS SEPARATION OF OBJECTS ACCORDING TO SPECIFIC GRAVITY
Jacob de Koning, Geleen, Netherlands, assignor to Stamicarbon N.V., Heerlen, Netherlands
Filed Dec. 10, 1957, Ser. No. 701,783
Claims priority, application Netherlands Dec. 14, 1956
2 Claims. (Cl. 209—73)

The present invention relates to improvements in an apparatus for separating objects according to their specific gravity and, more particularly, to improvements in apparatus for separating objects differing in size and shape, the apparatus being of the type utilizing the volume and mass of the objects being separated to effect a separation by specific gravity.

The present application is a continuation-in-part of my copending United States application, Serial No. 669,818, filed July 3, 1957 and entitled "Separating Objects According to Their Specific Gravity."

In my aforementioned copending application, Serial No. 669,818, a process and apparatus for separation according to specific gravity is disclosed, the separation being effected by comparing a force or an amount of kinetic energy which is proportional to the mass of the objects with a force or energy which is substantially proportional to a volumetric quantity depending on the dimensions of the objects being separated. A maximum force, which is proportional to the volume and weight of the object is produced when the object is moving and then the object is exposed to a reaction force, which serves to selectively retard the object as it moves through a predetermined distance and path. When the object has a specific gravity lower than the specific gravity of separation determined by the reaction force, the object will be restrained or stopped and discharged through a separate discharge path. On the other hand, when the object has a specific gravity higher than the specific gravity of separation the reaction forces acting against the object will retard or slow the object to a determined rate depending on the weight of the object, the object being discharged through another discharge path.

An object of the present invention is to provide an improved apparatus for separation of objects according to specific gravity, the separation being effected by utilizing a force or amount of kinetic energy which is proportional to the mass of the objects with a force or energy which is substantially proportional to a volumetric quantity, depending on the dimensions of the objects but being independent of the specific gravity of the objects.

Another object of the present invention is to provide an apparatus for separating objects according to specific gravity, the apparatus being provided with improved means for evenly distributing the objects to the means for applying the reaction forces to the objects, whereby the chance of two or more objects being simultaneously distributed one on top of another is substantially reduced or eliminated.

Still another object of the present invention is to provide an apparatus for separating objects differing in specific gravity, the apparatus being capable of increased capacity while maintaining a minimum error of separation.

These and other objects of the present invention will appear more fully in the following specification, claims and drawings, in which:

Figure 1:
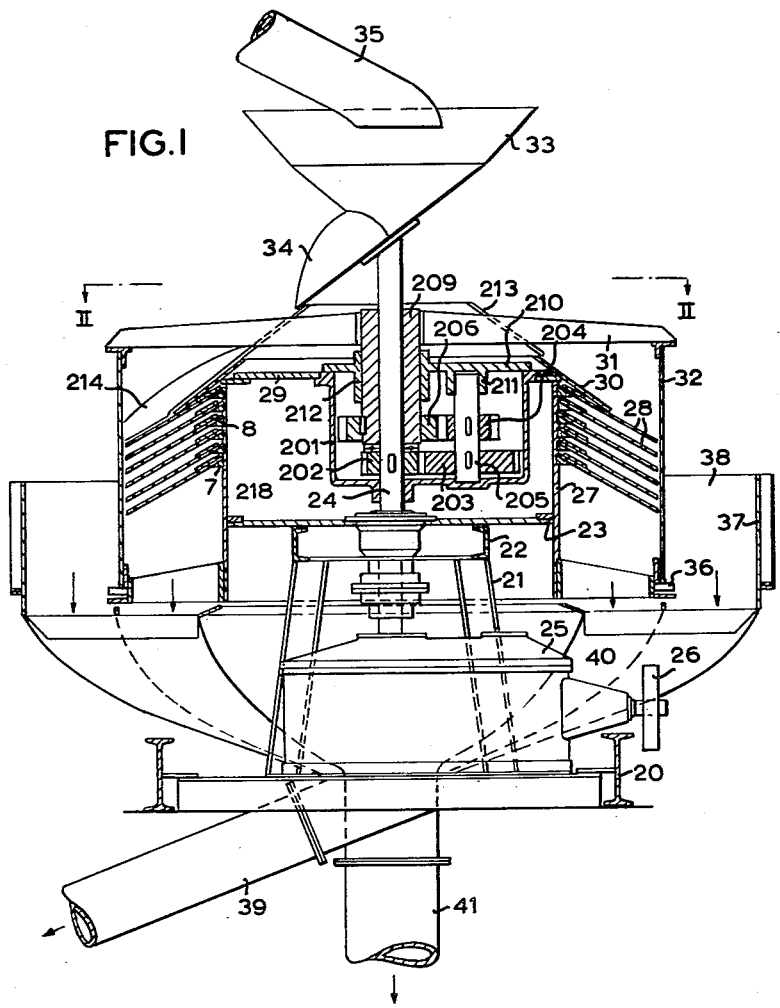
FIGURE 1 is a vertical longitudinal sectional view, partly in elevation, of an apparatus constructed according to the present invention.

In my aforementioned copending application, Serial No. 669,818, an apparatus is disclosed wherein objects to be separated according to specific gravity are fed from above to a rotational symmetrical bed. The bed includes a plurality of vertically spaced cantilever elements supported in such a manner as to be capable of elastic movement, the elements cooperating with a wall to define a path for the objects. In more detail, a plurality of juxtaposed groups of the cantilever elements are supported at their inner ends and extend radially of a vertical axis. A concentric wall or casing surrounds the elements adjacent to or touching the free ends thereof. The elements are arranged around the vertical axis in conical planes and are usually of uniform width and made of a resilient material. A funnel or trough is arranged above the elements and adapted to rotate with respect to the elements on the vertical axis of the groups of elements so as to distribute the objects to be separated thereon. The cylindrical wall surrounding the fixed resilient elements is rotated relative to the elements. A gate in the wall is provided to the rear of the feed trough for removing objects of lower specific gravity, whereas objects of higher specific gravity pass downwardly through the spring elements and are discharged therebeneath. As mentioned in the said copending application, the lag between the feed and the gate depends on the speed of the rotation of the feed and the falling speed of the objects of high specific gravity.

Referring now to the drawings, wherein like characters or reference numerals represent like or similar parts, the apparatus of the present invention is provided with a frame 20 having supports 21 mounted thereon, the supports carrying an annular beam 22. A circular plate 23 rests on the annular beam 22 and is provided with a central opening through which passes a vertical shaft 24. The shaft 24 is rotated by means of a motor (not shown), the motor driving a pulley 26 and a transmission installed within a gear box 25. A cylindrical shell 27 is mounted on the periphery of plate 23, the cylindrical shell carrying juxtaposed groups of vertically spaced resilient elements 28. The resilient elements radiate outwardly from the shell 27 and are connected to the shell by being clamped to supporting lugs 7 by screw-fastened clamping plates 8.

The elements are arranged around the shell 27 in conical planes, are all of uniform width and are arranged vertically in such a manner that the free ends of the spring elements, when depressed, can only coact with elements in the same group, that is, the end of a deflecting element cannot get into contact with an element of an adjacent group.

As clearly set forth in my co-pending U.S. application, Serial No. 669,818, controlled separation or classification of the objects is possible, provided the type of spring elements 28 and the distances between them are properly selected. The cooperation between the elements makes it possible to achieve a resultant of the counter-acting forces exerted by them on an object moving along their free ends, which will be substantially proportional to the square of the deflection of the free ends of the elements relative to the wall and, hence, to the square of the dimension of the object corresponding with the deflection. By having several juxtaposed groups of elements 28 exert their counter-acting forces on the object, the object will eventually be exposed to a force of reaction which is at most substantially proportional to its volume and as a result, the objects may be separated according to their specific gravity.

A casing 201 is supported inside of the cylindrical shell 27, the casing being adapted to house a gear reduction unit. The gear reduction unit comprises a gear wheel 202 mounted for rotation on the shaft 24, a gear wheel 203 mounted on a rotary shaft 205 and meshing with the gear 202, a second gear wheel 204 mounted on the shaft 205 and a gear wheel 206 meshing with the gear wheel 204 and mounted on a hollow sleeve 209. The sleeve 209 is mounted coaxially of shaft 24 and suitable bearings, such as ball or roller bearings, may be mounted between the shaft and the sleeve so that there will be no interference with each other's rotary movement.

The gear wheels 202, 203, 204 and 206 have pitch circles which are such that the sleeve 209 rotates at a lower speed and in the same direction as the shaft 24. The gear ratio of the reduction gear unit illustrated in FIGURE 1 is four to one but it is of course within the scope of the present invention that other gear ratios may be used.

A lid 210 encloses the gear reduction unit within the casing 201. A sleeve 211 provided on the undersurface of the lid 210 supports the upper end of shaft 205, whereas a sleeve 212 extending through the lid 210 fits around and supports the sleeve 209. A plate 29 covers the space between the shell 27 and the casing 201.

Mounted on the top of shell 27 is a stationary conical plate 30 which provides a guide for objects being discharged onto the elements 28. The end of sleeve 209 projecting above the upper edge of the conical plate 30 carries a number of spokes or rods 31 which are connected to a cylindrical shell 32. The shell 32 defines the wall for the separating bed and it can just touch the free ends of the elements 28 or be positioned within a short distance thereof. When sleeve 209 rotates, shell 32 will also rotate, the lower ends of the shell being supported on rollers 36.

Attached to the upper end of shaft 24 is a feed hopper 33 having a discharge trough 34 through which objects are fed to the separating bed defined by the groups of elements 28 and the wall 32. A stationary trough 35, having its outlet end positioned above the hopper 33, supplies the material to be separated to the hopper. Since the vertical shaft 24 rotates at a higher speed than the sleeve 209, the lower end of the discharge trough 34 should lie above the upper faces of the spokes 31. A conical shell 213 supported on the spokes 31 overlaps the upper edge of plate 30 and enables material to be fed from the trough 34 to the resilient or deformable elements 28.

Figure 2:
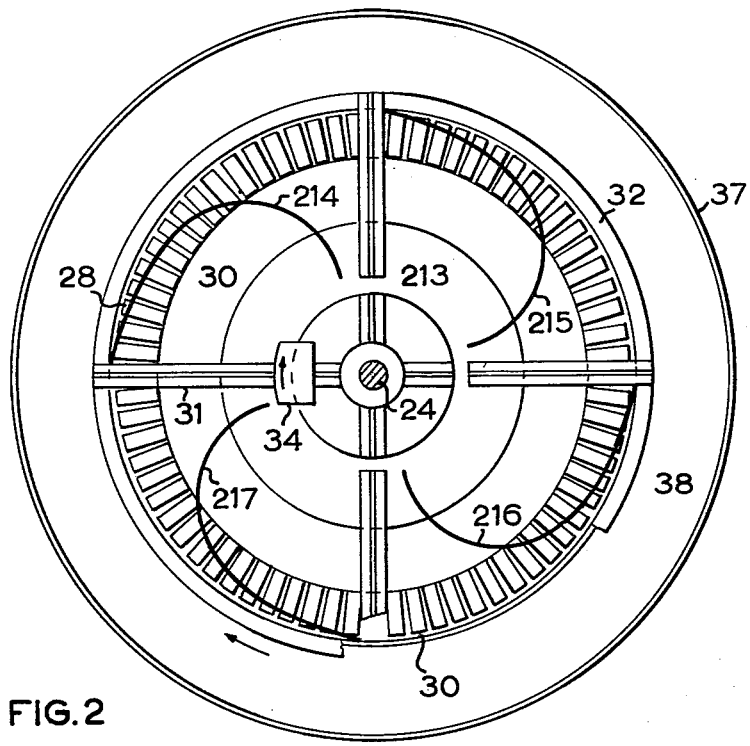
FIGURE 2 is a sectional view taken on the lines II—II of FIGURE 1, with part of the top flange of the wall broken away.

Shell 32 carries a number of curved blades 214, 215, 216 and 217 which rotate with the shell and the lower edges reaching within a short distance of the upper elements 28 of each group of elements and the conical plate 30. The free ends or the tips of the blades 214 to 217 inclusive terminate near the rotational circle of the lower edge of the feed trough 34, as best shown in FIGURE 2. Blades 214 to 217 have a curvature which is convex in the direction of rotation and the blades are actually ahead of their points of attachment to the shell 32, as is best shown in FIGURE 2.

Figure 3:
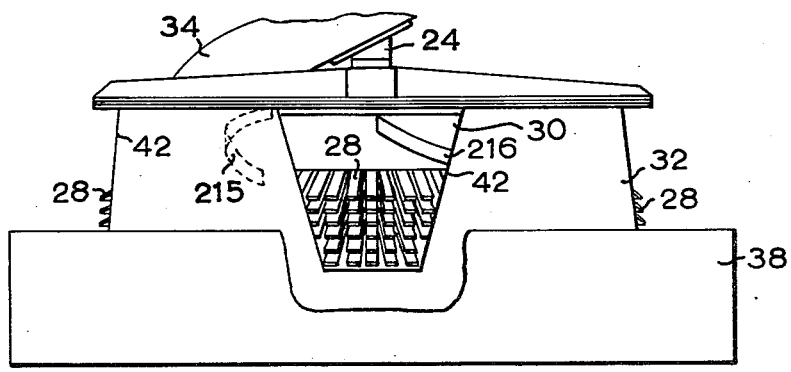
FIGURE 3 is a fragmentary front elevational view of the apparatus shown in FIGURE 1.

Shell 32 is provided with four discharge ports 42, as illustrated in FIGURE 3, and the stiffness of the spring elements 28 is such that objects whose specific gravity is lower than a predetermined separating density are retained by the springs 28 and the shell 32 until a port in the shell is reached where the objects may then drop out through the port 42. Identical to the arrangement in the aforementioned copending application, wherein a single port is provided lagging a short distance behind a single feeder, in the present apparatus a gate 42 is provided lagging a short distance behind the delivery end of each of the blades 214 to 217. Objects of higher specific gravity continue to move between the ends of the elements 28 and the shell 32 and are eventually discharged into a collecting trough 40. The trough 40 communicates with a pipe 41 and the objects are discharged therethrough from the apparatus. Objects of low specific gravity which pass through the ports 42 in the shell 32 are collected in a trough 38 defined by a cylindrical plate 37 in the outside of casing or wall 32. The trough 38 discharges the objects of low specific gravity through the pipe 39.

The operation of the apparatus heretofore described is as follows. Shell 32, together with its blades 214 to 217 inclusive and related ports 42, are rotated at a given speed around the spring elements 28. The discharge trough 34 rotates in the same direction as the shell 32 but its speed is a multiple of that of the shell 32. Consequently, objects dropping out of the trough 34 are successively flung against the blades 214 to 217 inclusive, so that the feed of objects is evenly distributed over the elements 28. The chance of two objects being deposited simultaneously on the same element is considerably reduced by such an arrangement and, thus, the errors of separation are reduced. By having the trough 34 rotate at $n$ times the speed of the wall 32 and its blades 214 to 217 inclusive, the flow of material from the trough during one revolution of the trough will be distributed over $n$ points of the deck defined by the top elements 28 of each group and, thus, the capacity of the device is increased. The number of blades 214 and 217 need not be equal to the ratio between the speed of the rotation of the feeding device and the wall, as its purpose is to promote an even distribution of the objects to be separated, as they are transferred from the feed device to the spring elements 28 before being discharged through the related port 42.

The terminology used in this specification is for the purpose of description and not limitation, the scope of the invention being defined in the claims.

I claim:

1. In an apparatus for continuously separating objects according to specific gravity, a plurality of cantilever elements radially arranged in fixed superposed groups about a vertical axis to form a resilient bed, each of said elements having an outer free end capable of flexural movement in a vertical plane, an annular wall disposed adjacent the outer free ends of said elements, the outer end of each element being deflected from a state of equilibrium upon impact with an object, each group of elements cooperating with said wall to develop a resultant force on an object substantially opposed to the direction of gravitational movement of said objects, means for rotating said wall about said vertical axis relative to the free ends of said elements, delivery means positioned above said resilient bed for supplying objects to the uppermost elements of the groups, said delivery means including a plurality of blades fixed to said wall and rotatable therewith for evenly dispersing said objects across the uppermost elements of the groups, a feed hopper rotatable on said vertical axis mounted above said blades, means for rotating said feed hopper at a speed exceeding the speed of said wall and blades, said wall having a plurality of circumferentially spaced discharge outlets formed therein corresponding to and cooperating with said blades for selectively separating objects in accordance with their gravitational movement through said bed, and collecting means disposed below said resilient bed for selectively receiving objects which pass downwardly through said bed.

2. An apparatus of the character described in claim 1, wherein said blades are curved and have a convex portion moving ahead of the point of attachment between the blade and the wall.

References Cited in the file of this patent

UNITED STATES PATENTS

| 1,046,447 | Delamater | Dec. 10, 1912 |
|---|---|---|
| 1,132,011 | Horst | Mar. 16, 1915 |
| 2,657,798 | Young | Nov. 3, 1953 |
| 2,726,401 | Raney | Dec. 13, 1955 |
| 2,828,012 | Komuchar | Mar. 25, 1958 |